Sept. 20, 1971 C. A. SHERMAN 3,606,250
GROUND TRANSPORT VEHICLE FOR AIRCRAFT PASSENGERS
Filed Dec. 12, 1969 2 Sheets-Sheet 1

INVENTOR.
Clarence A. Sherman
BY
Barnard, McGlynn & Reising
ATTORNEYS

United States Patent Office 3,606,250
Patented Sept. 20, 1971

3,606,250
GROUND TRANSPORT VEHICLE FOR AIRCRAFT PASSENGERS
Clarence A. Sherman, Birmingham, Mich., assignor to Benton Corporation, Troy, Mich.
Filed Dec. 12, 1969, Ser. No. 884,662
Int. Cl. B60s 9/02
U.S. Cl. 254—86                                10 Claims

ABSTRACT OF THE DISCLOSURE

A bus or similar vehicle for carrying passengers between an airport terminal and large aircraft parked at a distance from the terminal with means for raising and lowering the bus to permit the passengers to load and unload directly between the aircraft and the vehicle. A plurality of extendable and retractable jack assemblies are carried by the body for elevating the body to a selected height above the surface when the vehicle is parked adjacent to an aircraft. The jack assemblies each include an extendable and retractable main lifting jack having a free end movable relative to the body of the vehicle upon extension and retraction of the main lifting jack with a surface engaging member secured to the free end of the main lifting jack, and extendable and retractable stabilizing jacks. The stabilizing jacks extend at an angle from the surface engaging member with respect to the main lifting jack when the jack assemblies are extended to provide diagonal bracing of the main lifting jack. All of the jack assemblies are actuated simultaneously between their extended and retracted positions by a power system including proportioning means operable to proportion the flow of hydraulic fluid to and from the individual jack assemblies to control the rate of extension and retraction of the individual jacks and maintain the body in a level attitude.

---

This invention relates generally to vehicles having self-contained jacks for raising and lowering the vehicle relative to the surface, and is particularly concerned with passenger carrying vehicles such as buses having a self-contained system of jacks suitable for raising the vehicle to heights sufficient to permit passengers carried by the vehicle to load and unload directly between the vehicle and a large aircraft.

As larger and larger passenger aircraft are brought into service, the problems associated with transporting passengers between airport terminals and the aircraft have increased. It has become more and more desirable for the loading and unloading of the passengers to and from the aircraft to take place at locations removed considerably from the airport buildings.

To date, the general approach to this problem has been to provide complex, special vehicles for transporting the passengers from the airport terminal to the parked aircraft. One proposed system includes two separate vehicles, one of which consists of an elevator-loader which is driven to a position alongside the aircraft where an operator, working at a control panel, maneuvers a loading bridge into mating engagement with the aircraft passenger loading door. A bus is then loaded with the passengers and driven to the aircraft to mate with a lower portion of the first vehicle. When the passengers enter the first vehicle, the elevator is raised to bring the passengers to a level of the aircraft door.

Another approach to this problem includes a single specially-constructed vehicle including a passenger carrying body portion or capsule which is mounted on the main chassis of the vehicle for vertical movement. Hydraulic jacks are mounted on the chassis so as to raise and lower the passenger body or capsule relative to the main chassis. The passengers are loaded into the vehicle at ground level and are transported to the aircraft whereupon the capsule is elevated to a level sufficient to permit the passengers to board through the aircraft door.

An object of this invention is to provide a lifting system that can be incorporated in a vehicle of substantially conventional construction whereby the vehicle can be utilized to receive passengers at ground level at airport terminal buildings, and can then be driven to an aircraft and raised above ground level to unload the passengers directly into the aircraft.

A further object is to provide a vehicle suitable for transporting passengers and having a self-contained system of jacks for selectively raising the entire vehicle to the level of an aircraft door so that passengers can be unloaded directly into the aircraft from the vehicle.

A further object is to provide a vehicle having self-contained jack assemblies suitable for raising the vehicle to the height of the passenger door of large aircraft wherein the vehicle is supported entirely on the jacks, the jacks being braced diagonally to provide a stable support for the vehicle at the desired heights.

Still another object is to provide a vehicle having self-contained jack assemblies for raising the vehicle to selected heights corresponding to the height of a passenger door on large aircraft with means for maintaining the body of the vehicle in a level condition during its movement to and from its raised position.

In carrying out the foregoing, and other objects, a vehicle according to the present invention includes a body suitable for carrying passengers which may be in the form of a conventional bus body having transporting means such as wheels for supporting the body for horizontal movement over the ground or other surface. A plurality of extendable and retractable jack assemblies are carried by the body for elevating the body to a selected height above the surface when the vehicle is stationary.

Each jack assembly includes an extendable and retractable main lifting jack having a free end movable relative to the body, and a surface engaging member secured to the free end of the main lifting jack for engaging the ground to support the vehicle. Stabilizing jacks are included in each jack assembly each of which has a movable end secured to the surface engaging member and each of which extends at an angle from the surface engaging member with respect to the main lifting jack when the jack assembly is extended so that the stabilizing jacks provide diagonal bracing of the main lifting jacks.

In one preferred embodiment of the invention, each of the jack assemblies is interconnected with the body and its respective surface engaging member in such a manner as to cause the surface engaging member to move downwardly and outwardly relative to the body upon extension of the jack assemblies to increase the size of the supporting base as the vehicle is raised from the ground.

A power system is provided for simultaneously actuating all of the jack assemblies between their extended and retracted positions to respectively raise and lower the body relative to the surface. The power system includes flow proportioning means for proportioning the flow of hydraulic fluid to and from the jack assemblies during simultaneous actuation thereof to control the rate of extension and retraction of the individual jacks. More specifically, the flow proportioning means comprises level sensing devices operable to proportionally increase or decrease the rate of movement of individual jacks to maintain the body in a level attitude.

Other objects, advantages and features of the invention will become apparent from the following description taken in connection with the accompanying drawings in which.

Figures 1, 2:
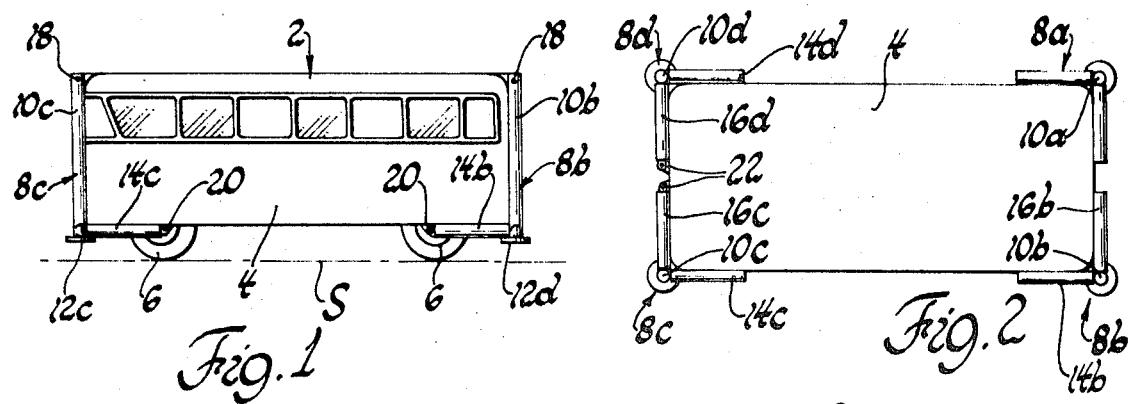
FIG. 1 is an elevational view of a vehicle embodying the present invention.
FIG. 2 is a top plan view of the vehicle of FIG. 1.
Figure 3:
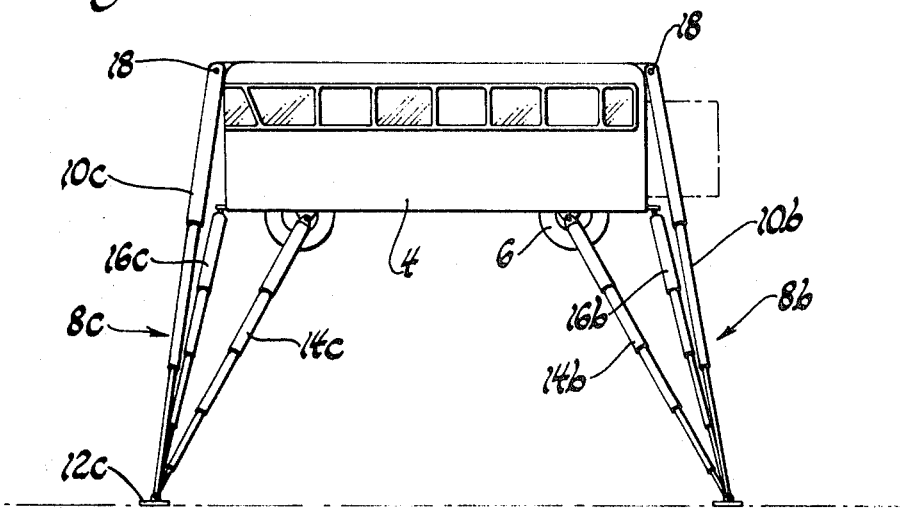
FIG. 3 is an elevational view of the vehicle of FIGS. 1 and 2 with the self-contained jack assemblies extended to raise the vehicle off the ground.

With reference to FIGS. 1 through 3, the present invention is embodied in a vehicle 2 having a body 4 in the form of a conventional bus body for carrying passengers. Transporting means in the form of wheels 6 is carried by the body 2 for supporting the body for movement over surface S between an airport terminal building and an aircraft parked at a distance from the building. Extendable and retractable jack assemblies 8 are carried by body 4 for elevating body 4 to a selected height above the surface S when the vehicle is stationary or is not moving horizontally. The elevated position of the vehicle is shown in FIG. 3. The four jack assemblies 8 for the left front, right front, right rear and left rear corners of the vehicle in FIGS. 1 through 3 are designated respectively as 8a, 8b, 8c and 8d.

Each jack assembly 8 includes a main lifting jack 10 having a free end movable relative to the body 4 upon extension and retraction of the main lifting jack 10, and a surface engaging member 12 which is secured to the free end of the main lifting jack. Extendable and retractable stabilizing jacks 14 and 16 are carried by the body 4 each having a movable free end secured to the surface engaging member 12. The stabilizing jacks 14 and 16 extend at an angle from the surface engaging member with respect to the main lifting jack when the jack assemblies 8 are extended to provide diagonal bracing of the main lifting jacks 10. Thus, the stabilizing jack 14c extends from the side of body 4 rearwardly and downwardly when extended to provide rearward and downward diagonal bracing of the main lifting jack 10c, and the stabilizing jack 16c is secured at one end to the rear of body 4 and extends outwardly and downwardly when the jack assembly 8c is extended. Each of the jack assemblies 8 is interconnected with the body 4 and its respective surface engaging member 12 to move downwardly and outwardly relative to the body 4 upon extension of the jack assemblies 8. Thus, the surface engaging members 12 are located outwardly from the body when the body is lifted to provide a more stable base for supporting the vehicle at the elevated position.

As shown in FIGS. 1 through 3, each main lifting jack 10 is pivotally secured at the top corner of body 4 by pivot pins 18. Each stabilizing jack 14 is pivotally secured at the lower edge of the side of body 4 by pivot pins 20, and each stabilizing jack 16 is pivotally secured by pivot pins 22 to the lower edge of the rear of the body 4 or to the lower edge of the front of the body 4.

Each jack 10, 14 and 16 in the illustrated embodiment of FIGS. 1 through 3 includes a plurality of telescoped sections which extend sequentially from the main cylinders pivotally secured to the body 4 at 18, 20 and 22, respectively when hydraulic fluid is caused to flow into one end of the main cylinder, the telescoped sections sequentially retracting into the respective main cylinders when hydraulic fluid is caused to flow into the other end thereof.

Figure 4:
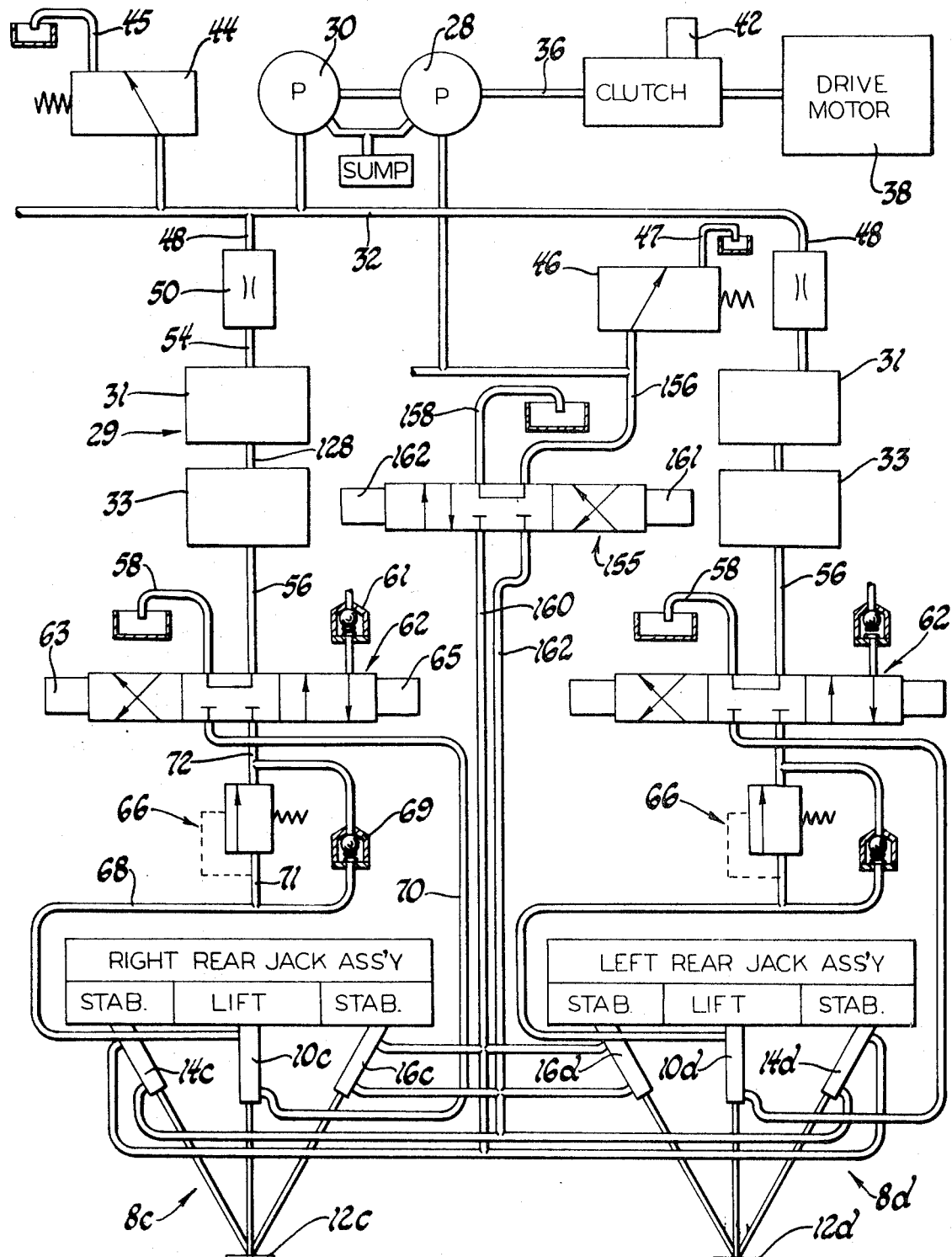
FIG. 4 is a schematic view of a portion of a hydraulic power system for actuating the jack assemblies of the vehicle of FIGS. 1 through 3.

With reference to FIG. 4, reference numeral 25 collectively designates a power system for simultaneously actuating the jack assemblies 8 between their extended and retracted positions to respectively raise and lower the body 4 relative to the surface S. As will be pointed out in greater detail below, the power system 25 includes flow proportioning means indicated by reference numeral 29 for proportioning the flow of hydraulic fluid to and from the jack assemblies 8 during simultaneous actuation of jack assemblies 8a, 8b, 8c and 8d to control the rate of extension and retraction of the individual jacks. The flow proportioning means 29 in the illustrated embodiment comprises level sensing means 31 and 33 operable to proportionally increase or decrease the rate of movement, or the rate of extension and retraction, of the individual jacks 10, 14 and 16 as necessary to maintain the body 4 in a level attitude during raising and lowering of the body 4 relative to the surface S.

The power system 25 includes a source of hydraulic fluid in the form of a main lifting system pump 30 and a stabilizing system pump 28. Pumps 30 and 28 each have their intakes connected with a sump or reservoir of hydraulic fluid with their outputs respectively connected with a main lifting cylinder feed line or conduit 32, and a stabilizing feed line or conduit 34. Pumps 28 and 30 are each connected by means of a shaft 36 with a drive motor 38 through a clutch 40 which may be operated by a solenoid 42. The main lifting cylinder feed line 32 is connected with a relief valve 44 operable to connect line 32 with the sump through a drain line 45 when the pressure in line 32 exceeds a desired maximum. Similarly, the stabilizing feed line 34 is connected with a relief valve 46 operable to connect the stabilizing feed line 34 with the sump or reservoir through a line 47 when the pressure in line 34 is sufficient to overcome the biasing force on valve 46.

Extending from the main feed line 32 to each jack assembly is a line 48 which connects line 32 with a flow control valve 50. A conduit 54 extends from the flow control valve 50 and connects with the flow proportioning means 29. The flow control valve 50 operates to provide a controlled rate of flow to line 54 from the main lifting pump 30. Extending from the flow proportioning means 29 is an output line 56 connected with a control valve 62. Also connected with valve 62 is a drain line 58 to the reservoir. Valve means 62 is selectively operable to cause flow of hydraulic fluid to the jack assemblies 8 to raise the body 4 and to cause flow of hydraulic fluid from the jack assemblies 8 to lower the body 4.

With reference to the right rear jack assembly 8c of FIG. 4, a lifting line 68 extends from valve 62 and is connected with the main cylinder of the main lifting jack such that flow from line 68 to the main cylinder of the main lifting jack 10c causes the lifting jack to extend. Connected in line 68 is a counterbalance valve 66 which permits free flow from valve 62 through check valve 69 to jack 10c, but permits flow in the opposite direction only at a controlled rate. Thus, retraction of the main lifting jack 10c resulting in flow from jack 10c to valve 62 through line 68 can take place only at a rate determined by the biasing means 67 of the counterbalance valve 66. The pressure in line 68 must be sufficient to overcome the biasing means 67 before portions 71 and 72 of the line will be placed in communication with each other.

Lowering lines 70 extend from each valve 62 to the main cylinder of the respective main lifting jack 10 such that flow to the main cylinder of jack 10 through the lowering line 70 from valve 62 causes the lifting jack 10 to retract. Thus, flow into the main cylinder of jack 10c from line 70 causes jack 10c to retract.

Each valve 62 is selectively movable to a first or raising position to permit flow of hydraulic fluid in the direction to extend the jack assembly 8; a second or lowering position to permit flow of hydraulic fluid in a direction to retract jack assemblies; and a third neutral position in which flow is blocked in either direction. Valve 62 is operated in one direction by energization of a solenoid 63, and is operated in the other direction by energization of a solenoid 65.

Valve 62 for the jack assembly 8c is shown in the third, or neutral position in FIG. 4. Movement of valve 62 to the left as viewed in FIG. 4 places valve 62 in the raising position such that line 68 is connected with line 56 through check valve 61 to cause flow of fluid to jack 10c through line 68 in a direction to extend jack 10c, and line 70 is connected with drain line 58. Conversely, movement of valve 62 to the right as viewed in FIG. 4 places valve 62 in the lowering position such that line 68 is connected with drain line 58, and line 70 is connected with line 56 to cause flow of fluid to jack 10c through line 70 in a direction to retract jack 10c. In the illustrated neutral position, line 56 is connected directly with drain line 58 so that any fluid flowing from line 56 is directed to sump.

Figure 5:
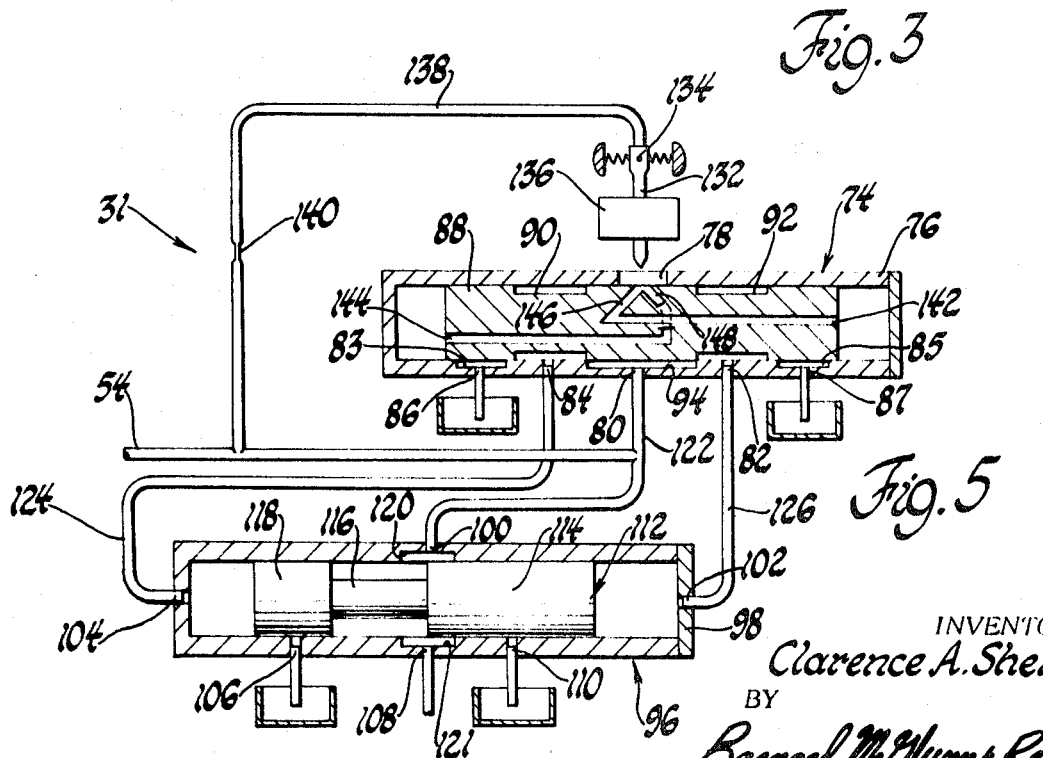
FIG. 5 is a schematic view of a portion of the hydraulic system illustrated in FIG. 4.

As stated previously, the flow proportioning means 29 comprises level sensing means 31 and 33, and a level sensing means 31 is illustrated in detail in FIG. 5 in the form of a level sensing servo system. The level sensing means 33 is identical to the level sensing means 31 and is therefore not illustrated in detail in the drawings.

In FIG. 5, reference numeral 74 collectively designates a valve assembly including a housing 76 formed with ports 78, 80, 82, 84, 86 and 87. Slidably mounted within the valve housing 76 is a cylindrical valve member 88 formed with a pair of axially spaced annular grooves or recesses 90 and 92. A recess 94 is formed in the wall of housing 76 and surrounds port 80. Similarly, recesses 83 and 85 surround ports 86 and 87, respectively.

Reference numeral 96 collectively designates a valve assembly including a housing 98 formed with ports 100, 102, 104, 106, 108 and 110. A valve 112 is slidably mounted in housing 98 and includes cylindrical portions 114 and 118 connected by a reduced portion 116. Recesses 120 and 121 are formed in the wall of housing 98 and surround ports 100 and 108, respectively. Port 80 of housing 76 communicates with port 100 of housing 98 through a line 122, which in turn is in communication with line 54. Ports 82 and 102 are connected by line 126, and ports 84 and 104 are connected by a line 124. Ports 86, 87, 106 and 110 each connect with drain lines to the reservoir. Port 108 connects with an output line 128 which forms a continuation of line 54.

In the position of the valves illustrated in FIG. 5, fluid flows from line 54 to line 122, and from line 122 into ports 80 and 100. The rate at which fluid flows from port 100 through port 108 is determined by the position of valve 112. Movement of valve 112 toward the left in FIG. 5 reduces the rate of flow through port 108 into line 128. Conversely, movement of valve 112 toward the right in FIG. 5 increases the rate of flow through port 108 into line 128.

When valve 88 is centered in valve housing 76 as shown in FIG. 5, the pressure on the cylindrical portion 118 from port 104 is the same as the pressure on cylindrical portion 114 from port 102. Movement of valve 88 to the right in FIG. 5 connects port 80 with port 84 through the annular groove 90 to admit additional hydraulic fluid into line 124. At the same time, port 82 is connected with the drain port 87. As a consequence, valve 112 moves to the right in FIG. 5 to increase the rate of flow through line 108.

Movement of valve 88 toward the left in FIG. 5 connects port 80 with port 82 through groove 92 thereby causing valve 112 to shift to the left in FIG. 5 and decrease the flow through line 108. The leftward movement of valve 88 connects port 84 with the drain port 86.

The position of valve 88 is determined by the position of a pendulum valve or nozzle 132 pivotally mounted at 134 and carrying a weight 136. Nozzle 132 communicates with a line 138 which in turn communicates with line 54. A restriction 140 is formed in line 138. Valve 88 is formed with passages 142 and 144 which are each connected with angularly extending passages 146 and 148, respectively, having a common inlet port communicating with port 78. Weight 136 biases the nozzle 132 to a vertical position due to the action of gravity. Consequently, as long as the body 4 of the vehicle is level, valve 88 will remain in the position shown in FIG. 5 since equal amounts of fluid are delivered by nozzle 132 through passages 142 and 144.

Should the body of the vehicle tilt in a direction to cause nozzle 132 to pivot about pivot point 134 in a clockwise direction as viewed in FIG. 5 or toward the left, the amount of fluid delivered through port 142 will increase and the amount of fluid delivered through passage 144 will be correspondingly decreased thereby causing valve 88 to shift toward the left and decrease the flow through line 108. Conversely, counterclockwise movement of nozzle 132 will cause valve 88 to shift toward the right in FIG. 5 which in turn causes righward movement of valve 112 to increase the flow through line 108.

In the illustrated embodiment, the level sensing systems 31 and 33 are connected in series, and system 31 senses lateral tilting while system 33 senses fore and aft tilting. That is to say, the pendulum nozzle 132 of system 31 pivots about a fore and aft axis to sense lateral tilting while the corresponding nozzle of system 33 (not shown) pivots about an axis transverse to the axis of nozzle 132. Accordingly, if the left rear jack assembly begins to extend or retract at a faster rate than the right rear jack assembly in FIG. 4, the level sensing system 31 for the jack assembly 10 will cause an increased flow through lines 128 and 56, while the corresponding system 31 for jack assembly 8b will cause a corresponding decrease in the flow through the corresponding lines. The level systems 33 operate in a similar manner to correct fore and aft tilting.

Communication between the stabilizing feed line 34 and the stabilizing jacks 14 and 16 is controlled by a stabilizing jack control valve 155. Valve 155 is selectively operable to cause flow of hydraulic fluid to the stabilizing jacks 14c, 14d, 16c and 16d in a direction to raise the body 4 and to cause flow of hydraulic fluid from jack 14c, 14d, 16c and 16d in a direction to lower the body 4.

Valve 155 is connected with a line 156 from the stabilizing feed line 34 as well as a drain line 158. Extending from valve 155 is a lifting line 160 and a lowering line 162 each of which communicates hydraulically with each of the stabilizing jacks 14c, 14d, 16c and 16d. Flow of fluid from line 160 into the upper ends of the main cylinders of the respective stabilizing jacks causes the stabilizing jacks to extend and raise the body 4 along with the extension of the main lifting jacks 10c and 10d. Conversely, flow of fluid from line 162 into the lower ends of the main cylinders of the stabilizing jacks 14c, 14d, 16c and 16d causes the stabilizing jacks to retract.

Valve 155 is selectively movable to a first, or raising position to permit flow of hydraulic fluid in the direction to extend the stabilizing jacks; a second, or lowering position to permit flow of hydraulic fluid in a direction to retract the stabilizing jacks; and a third, neutral position in which flow is blocked in either directon from the stabilizing jacks. Valve 155 is operated in one direction by energization of a solenoid 161, and is operated in the other direction by energization of a solenoid 162.

Valve 155 is shown in the neutral position in FIG. 4. Movement of valve 155 to the left as viewed in FIG. 4 places valve 155 in the raising position such that line 156 is connected with line 160 to cause flow of fluid to the stabilizing jacks 14c, 14d, 16c and 16d in a direction to extend the stabilizing jacks, and the drain line 158 is connected with line 162. Conversely, movement of valve 155 to the right as viewed in FIG. 4 places valve 155 in the lowering position such that line 160 is connected with drain line 158, and line 162 is connected with line 156 to cause flow of fluid to the stabilizing jacks 14 and 16 through line 162 in a direction to retract the jacks. In the illustrated neutral position, line 156 is connected directly with drain line 158 so that any fluid flowing from line 156 is directed to the reservoir. An identical system to that shown in FIG. 4 is provided for the forward jack assemblies, the forward system also being connected with the feed lines 32 and 34.

With the jack assemblies in the retracted condition as illustrated in FIGS. 1 and 2, passengers may be loaded onto the vehicle at ground level and transported to an aircraft at a suitable boarding location. When the vehicle 2 reaches the boarding location and is maneuvered into juxtaposition with the aircraft, solenoids 42, 65 and 161 are simultaneously energized to actuate clutch 40 to engage the pumps 28 and 30 with the drive shaft 36 and to actuate valves 62 and 155 to the raising position. The jack assemblies 8a, b, c and d are simultaneously extended to lift the vehicle to the position illustrated in FIG. 3. The passengers may then board the aircraft through an extendable and retractable passageway carried by the vehicle which is indicated in phantom lines in FIG. 3. When the passengers have all been transferred to the aircraft, all of the solenoids 163 and 162 are energized to simultaneously actuate all of the valves 62 and both valves 155 to the lowering position to retract the jack assemblies and return the vehicle to the condition illustrated in FIGS. 1 and 2. Valves 62 and 155 may be biased to the neutral position such that they automatically return to the neutral positions illustrated in FIG. 4 when the respective solenoids are de-energized. During raising or lowering of the vehicle, the flow proportioning means 29 will operate to proportion the flow to the individual jack assemblies in such a manner as to prevent tilting of the vehicle.

The main lifting jacks 10 each have a greater diameter than the stabilizing jacks 14 and 16. In the illustrated system, the pumps 28 and 30 may comprise radial or axial piston pumps, the main lifting pump 30 being of greater capacity than the stabilizing pump 28. The main lifting pump 30 may comprise a radial piston pump having four pistons each feeding to one of the main lifting cylinders 10, while the stabilizing pump may comprise a radial piston pump having eight pistons, or one feeding to each of the stabilizing jacks 14 and 16. Alternatively, a single pump having twelve pistons with four large pistons for the lift cylinders 10 may also be employed.

The illustrated embodiment therefore includes a hydraulic system comprising a main feed line 32 for conducting hydraulic fluid from a pressurized source 30; a plurality of lifting lines 68; a plurality of lowering lines 70; means 62 for selectively simultaneously connecting all of said lifting lines 68 with the feed line 32 and all of the lowering lines 70 to the reservoir, or for simultaneously connecting all of the lowering lines with the feed lines and all of the lifting lines with the reservoir; and flow proportioning means 29 operable to prevent flow from the feed line 32 into any one of the lifting or lowering lines from exceeding the flow from the feed line to the other lifting or lowering lines.

The invention is also embodied in a plurality of extendable and contractible lifting jacks 10, a reservoir for hydraulic fluid, a main feed line 32 for conducting hydraulic fluid from the reservoir, a plurality of lifting lines 68 each connected with one of the lifting jacks 10 and an equal number of lowering lines each connected with one of the lifting jacks 10, means 62 for selectively simultaneously connecting all of the lifting lines 68 with the feed line 32 and all of the lowering lines 70 with the reservoir to simultaneously extend all of the jacks 10, or for simultaneously connecting all of the lifting lines 68 with the reservoir and all of said lowering lines 70 with the feed line 32 to simultaneously retract all of the lifting jacks; and flow proportioning means 29 operable to prevent any one of the lifting jacks from extending or retracting at a different rate than the other jacks.

While a specific example of the invention has been illustrated and described in the foregoing specification and accompanying drawings, it should be understood that the invention is not limited to the exact construction, but that various alternatives in the construction and arrangement of parts, all falling within the scope and spirit of the invention, will be apparent to those skilled in the art.

The embodiments of the invention in which an exclusive property or privilege is claimed are defined as follows:

1. A vehicle comprising: a body; transporting means carried by the body for supporting the body for movement over a surface; a plurality of extendable and retractable jack assemblies carried by said body for elevating the body to a selected height above the surface when the vehicle is stationary, said jack assemblies each including: an extendable and retractable main lifting jack having a free end movable relative to said body upon extension and retraction of said main lifting jack, a surface engaging member secured to said free end of said main lifting jack, and at least one extendable and retractable stabilizing jack carried by said body and having a movable free end secured to said surface engaging member, said stabilizing jack extending at an angle from said surface engaging member with respect to said main lifting jack when said jack assembly is extended to provide diagonal bracing of said main lifting jack.

2. A vehicle as claimed in claim 1 wherein each of said jack assemblies is interconnected with said body and its respective surface engaging member to cause the surface engaging member to move downwardly and outwardly relative to said body upon extension of the jack assembly.

3. A vehicle as claimed in claim 1 including a power system for simultaneously actuating said plurality of jack assemblies between their extended and retracted positions to respectively raise and lower said body relative to the surface.

4. A vehicle as claimed in claim 3 wherein said power system includes level sensing means operable to control the rate of movement of the individual jack assemblies during raising and lowering of said body to prevent tilting of said body.

5. A vehicle as claimed in claim 3 wherein said power system includes a source of hydraulic fluid, and said jacks are each extendable and retractable in response to flow of hydraulic fluid respectively to and from said jacks.

6. A vehicle as claimed in claim 5 including means selectively operable to cause flow of hydraulic fluid to said jack assemblies to raise said body and to cause flow of hydraulic fluid from said jack assemblies to lower said body.

7. A vehicle as claimed in claim 6 wherein said last named means comprises a valve selectively movable to a first position to permit flow of hydraulic fluid in the direction to extend said jack assemblies a second position to permit flow of hydraulic fluid in a direction to retract said jack assemblies, and a third position blocking flow of hydraulic fluid in either direction.

8. A vehicle as claimed in claim 3 further including flow proportioning means for proportioning the flow of hydraulic fluid to and from said jack assemblies during simultaneous actuation of said jack assemblies to control the rate of extension and contraction of the individual jacks.

9. A vehicle as claimed in claim 8 wherein said flow proportioning means comprises level sensing means operable to proportionally increase or decrease the rate of movement of the individual jacks to maintain said body level.

10. A vehicle as claimed in claim 9 wherein said level sensing means comprises a tilt responsive pendulum valve for each jack assembly operable in response to tilting of said body to adjust the rate of flow to and from its associated main lifting jack in the direction to correct the tilt and restore the body to a level condition.

References Cited
UNITED STATES PATENTS

| | | | |
|---|---|---|---|
| 3,060,471 | 10/1962 | Der Yuen | 296—28.A(X) |
| 3,419,164 | 12/1968 | O'Neill | 214—512X |
| 3,537,745 | 11/1970 | Herring, Jr. | 214—512X |

OTHELL M. SIMPSON, Primary Examiner

U.S. Cl. X.R.

214—512; 254—93; 296—28